(No Model.)
G. W. KELSEY.
FLY NET FOR HORSES.
No. 364,020. Patented May 31, 1887.
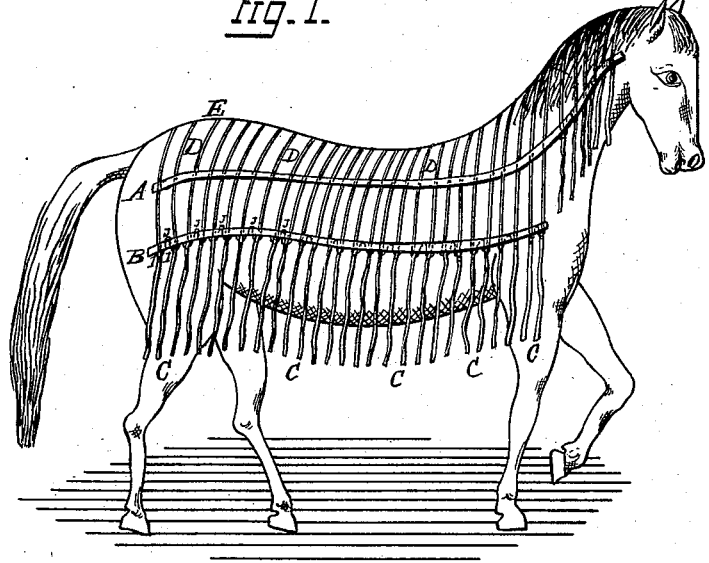
Fig. I.
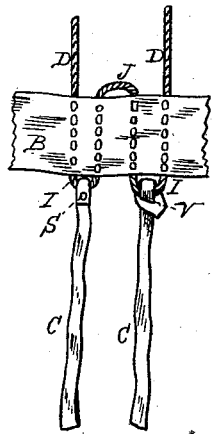
Fig. II.
Witnesses.
B. M. Whitaker.
F. H. Moore.
Inventor.
George W. Kelsey.
By G. L. Chapin.
Attorney.

UNITED STATES PATENT OFFICE.

GEORGE W. KELSEY, OF CHICAGO, ILLINOIS, ASSIGNOR TO MARY A. KELSEY, OF SAME PLACE.

FLY-NET FOR HORSES.

SPECIFICATION forming part of Letters Patent No. 364,020, dated May 31, 1887.

Application filed April 5, 1887. Serial No. 233,707. (No model.)

*To all whom it may concern:*

Be it known that I, GEORGE W. KELSEY, a citizen of the United States, and a resident of Chicago, county of Cook, and State of Illinois, have invented new and useful Improvements in Fly-Nets, of which the following is a specification, reference being had to the accompanying drawings illustrating the invention, in which—

Figure I represents my improved fly-net on a horse. Fig. II is a detail portion thereof enlarged.

This invention relates to novel means for connecting the lower webbing with the lashes and the transverse cording. The advantages attained are a cheaper net and one that will not tangle in use, and one that the cording cannot be drawn through the lower webbing to put the net out of shape. It has been the custom to weave the transverse cording into the webbing, but not to weave the cording in the webbing to form loops on both edges of the webbing, as herein shown.

E represents the back webbing, A the side webbing, and B the lower webbing, to the net. D D D represent the cording, which is woven into the webbing E A in a manner well known in the art of making fly-nets, but the cording is woven into the webbing B, so as to form loops J at the top edge thereof and loops I at the bottom edge thereof. The purpose of the loops I is for means for attaching the lashes C, and the purpose of the loops J to prevent the webbing from sliding on the cording and putting the netting out of shape. The lashes C are made of leather or some material which is stiff enough not to become tangled.

The lashes C may be secured to the loops I by being lapped around them and the laps fastened by rivets or wound by wire, or they may be slotted at the ends and looped onto the loops I by putting the lash through the slot. The rivet attachment is shown at S, and the slotted loop attachment at V. From this it will be seen that the net is quite light above the webbing B, whereby the heavier lashes C will keep the cording D from getting tangled.

I claim and desire to secure by Letters Patent of the United States—

An improvement in fly-nets for horses, consisting of the webbing A E and cording D, with the webbing B, and the cording formed with lower cording-loops, I, and upper loops, J, in combination with the leather lashes C C, secured to the loops I, substantially as specified.

GEORGE W. KELSEY.

Witnesses:
G. L. CHAPIN,
MILO COVEL.